May 28, 1935.  H. H. ROBINSON  2,002,833
ALARM SYSTEM FOR TRACTOR TRAILER COMBINATIONS
Filed May 22, 1933
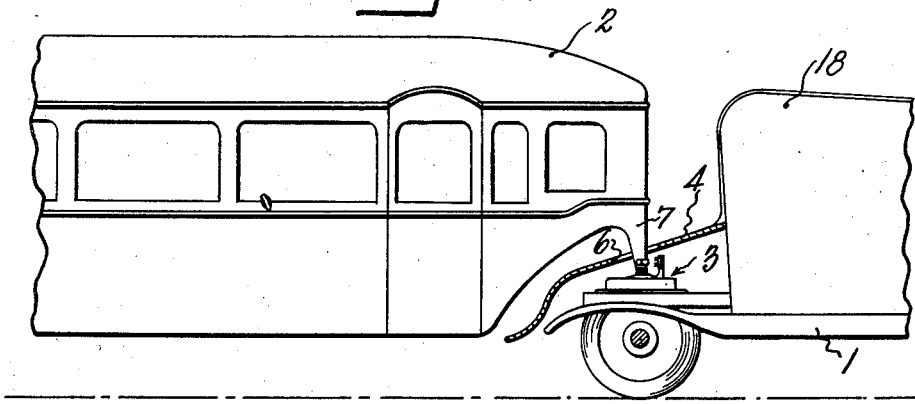
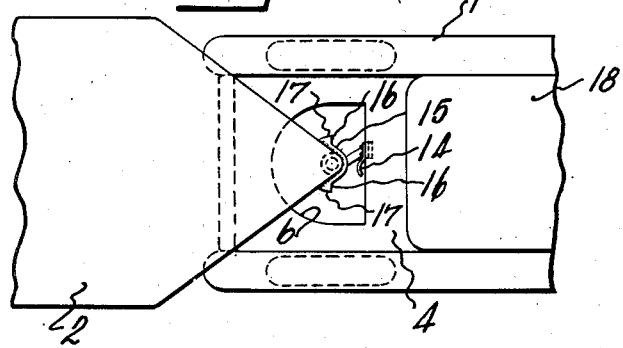
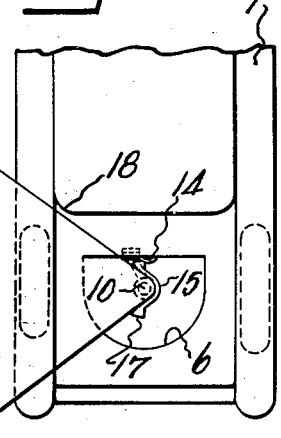
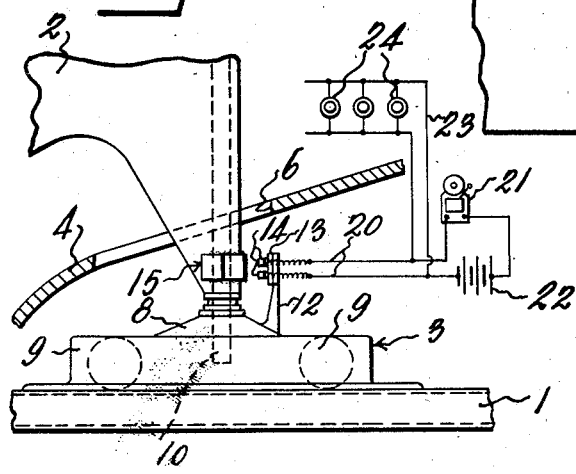
INVENTOR.
HAROLD H. ROBINSON
BY Chapin + Neal
ATTORNEYS.

Patented May 28, 1935

2,002,833

UNITED STATES PATENT OFFICE 2,002,833

ALARM SYSTEM FOR TRACTOR-TRAILER COMBINATIONS

Harold H. Robinson, Opalocka, Fla., assignor to Curtiss Aerocar Company, Inc., Opalocka, Fla., a corporation of Florida Application May 22, 1933, Serial No. 672,134

2 Claims. (Cl. 177—311)

This invention relates to an alarm or warning system to inform the driver of the tractor or tow car of a tractor-trailer combination as to the angular relation between the vehicles.

The principal object of the invention is to give a warning to the driver of the tow car when the angular relation of the trailer and tow car has reached a position where further turning of the tow car will cause damage to one or both of the vehicles.

A further object is to provide such a warning system in which the tow car and trailer may be separated without the necessity of manipulating or adjusting any part of the system.

Another object is to provide such a system in which the relative movement of the nose of the trailer and the fifth wheel on the tow car may be used to determine the operation of the signal.

Other and further objects will be apparent from the following specification and claims.

In the accompanying drawing which illustrates one embodiment of the invention,

Fig. 1 is a side elevation partly in section showing the forward portion of the trailer and the rear portion of the tractor of a tractor-trailer combination embodying my invention;

Fig. 2 is a detail side view, partly in section and on a larger scale of the fifth wheel connection between the vehicles;

Fig. 3 is a plan view showing the relation of the parts when the vehicles are in alignment; and Fig. 4 is a similar view showing the relation of the parts when the vehicles are positioned in the maximum safe angular relation.

Referring to the drawing, 1 indicates the tractor or tow car which as shown takes the form of a conventional coupe. The trailer is indicated at 2, the vehicles being connected together by a fifth wheel coupling, generally indicated at 3, positioned within the rear deck 4 of the tow car, the deck being provided with an opening 6 through which the nose 7 of the trailer projects to effect the connection of the vehicles. As shown the fifth wheel 3 is of the type disclosed in copending application Serial No. 650,346, filed January 5, 1933, and comprises a hub or wheel 8 provided on its periphery with a pneumatic tire 9 clamped in a horizontal frame 9 suitably supported within the deck of the tow car. Nose 7 of the trailer is provided with a pin 10 adapted to engage within the hub 8 to permit relative angular movement between the vehicles, the draft shocks being cushioned by the pneumatic tire as more fully set out in the above mentioned application. Since the fifth wheel coupling may take various forms and the specific details thereof do not form a part of the present invention further description is not believed necessary.

Hub 8 is provided with an upstanding bracket 12 carrying at its upper end a fiber insulating block 13 to which are secured spaced spring contact members 14. A metallic block 15 is welded, or otherwise secured, to the nose of the trailer, on a level with springs 14. Block 15 is provided adjacent the sides of the nose with projections 16, the surfaces 17 of which are arcuate and concentric with the fifth wheel coupling. The projections 16 extend outwardly from the nose sufficiently to contact the springs 14 when the vehicles assume approximately a right angle position with respect to each other. The peripheral extent of the arcuate surfaces 17 is made sufficient so that contact is made with the springs 14 just before the trailer nose comes in contact with the cab 18 of the tow car, as shown in Fig. 4, when the latter is turned with respect to the trailer. The surfaces 17 have a height sufficient to bridge the space between the springs 14 and the springs are so positioned as to exert a degree of pressure against the surfaces 17 sufficient to establish a reliable electrical connection between the springs through the member 16.

The springs 14 are respectively connected to the lines 20 of an electrical circuit including a bell 21 and a suitable battery 22. As diagrammatically shown in Fig. 2 the bell and battery may be those of a passenger signaling circuit 23 including the push buttons 24 designed to be operated by passengers in the trailer.

In operation the system is inactive when the steering is such that no dangerous approach is made between the bodies of the vehicles, but when the turning angle between the trailer and tow car approximates a right angle, and the vehicle bodies are brought into dangerous proximity to each other, one or the other of the arcuate surfaces 17 contacts the springs 14 thereby closing the alarm circuit, causing the bell to ring and warn the driver.

It will be understood that any suitable form of alarm may be employed, either audible or visual and that while I prefer the wiping spring contact shown, since it is self-cleaning and therefore more reliable where the surfaces are exposed to dirt or oxidation, other types of contact may be employed to meet varying installation conditions.

It will be seen that since the spring contact members are carried by the fifth wheel element secured to the tow car while member 15 is secured to the trailer prow, in separating the two vehicles it is only necessary to proceed in the usual manner and lift the nose pin 10 from its seat in hub 8, as no disconnection of members of the alarm circuit is necessary.

What I claim is:

1. In a tractor-trailer combination wherein the two vehicles are pivotally connected together for relative angular movement in a horizontal plane, a normally open alarm circuit including a pair of spaced switch contact members secured to one of the vehicles on substantially the center line thereof, two horizontally spaced switch closing members, secured to the other vehicle and positioned on opposite sides of the center line of the last named vehicle, to alternatively engage and connect said switch contact members to close the alarm circuit when the vehicles assume a predetermined relative angular position to either side of a common center line.

2. In a tractor-trailer combination wherein the two vehicles are pivotally connected together for relative angular movement in a horizontal plane, a normally open alarm circuit including a pair of spaced switch contact members secured to the tractor substantially on the center line thereof, two horizontally spaced switch closing members secured to the trailer and positioned on opposite sides of the center line of the trailer to alternatively engage and connect said switch contact members to close the alarm circuit when the tractor and trailer assume a predetermined relative angular position to either side of a common center line.

HAROLD H. ROBINSON.